US008612628B1

(12) United States Patent
Padlia et al.

(10) Patent No.: US 8,612,628 B1
(45) Date of Patent: Dec. 17, 2013

(54) METHOD AND SYSTEM FOR TRANSFERRING REPETITIVE IMAGES OVER COMPUTER NETWORKS

(75) Inventors: Abhay Padlia, Bangalore (IN); Sachin Mishra, Varanasi (IN)

(73) Assignee: Novell, Inc., Provo, UT (US)

( * ) Notice: Subject to any disclaimer, the term of this patent is extended or adjusted under 35 U.S.C. 154(b) by 2271 days.

(21) Appl. No.: 10/337,460

(22) Filed: Jan. 7, 2003

(51) Int. Cl.
*G06F 15/16* (2006.01)

(52) U.S. Cl.
USPC .......................................... 709/246; 709/204

(58) Field of Classification Search
USPC ................................................. 709/204, 246
See application file for complete search history.

(56) References Cited

U.S. PATENT DOCUMENTS

| | | | |
|---|---|---|---|
| 6,191,782 B1 | 2/2001 | Mori et al. | |
| 6,434,320 B1 * | 8/2002 | Orth et al. | 386/68 |
| 6,445,822 B1 * | 9/2002 | Crill et al. | 382/218 |
| 6,678,069 B1 * | 1/2004 | Abe | 358/1.18 |
| 6,678,417 B1 * | 1/2004 | Baumgartner et al. | 382/236 |
| 6,721,846 B2 * | 4/2004 | Mund et al. | 711/118 |
| 6,804,418 B1 * | 10/2004 | Yu et al. | 382/299 |
| 7,079,289 B2 * | 7/2006 | Loce et al. | 358/3.03 |
| 7,130,474 B2 * | 10/2006 | Luo et al. | 382/239 |
| 2002/0054044 A1 * | 5/2002 | Lu et al. | 345/536 |
| 2002/0136294 A1 * | 9/2002 | Culbert | 375/240.02 |
| 2003/0007695 A1 * | 1/2003 | Bossut et al. | 382/239 |
| 2003/0081840 A1 * | 5/2003 | Palmer et al. | 382/232 |
| 2004/0243635 A1 * | 12/2004 | Christophersen et al. | 707/104.1 |

* cited by examiner

*Primary Examiner* — Joshua Joo
(74) *Attorney, Agent, or Firm* — Haynes and Boone, LLP

(57) ABSTRACT

A method and system is provided for enhancing a reproduction of a recurring image of an first computer on a second computer in a computer network. In order to avoid transferring high color depth high volume of data for recurring images on one computer to another, the recurring image is invoked by a low bit identifier. For example, between a controlling and controlled computer, if a controlled computer detects a first screen image wherein the first screen image having a relative high color depth, it identifies the first screen image by assigning a first identifier (ID). Then, the controlled computer produces a low color depth representation of the first screen image to be stored, and sends the first screen image to the controlling computer along with the first ID. The controlling computer compresses and stores the first screen image along with the first ID. When the controlled computer, by using the stored low color depth representation of the first screen image, detects that a second screen image is a part of the first screen image or is the same as the first screen image, it sends the first ID to the controlling computer for invoking the first screen stored on the controlling computer, and the controlling computer retrieves and displays the stored first screen image.

11 Claims, 4 Drawing Sheets

METHOD AND SYSTEM FOR TRANSFERRING REPETITIVE IMAGES OVER COMPUTER NETWORKS

TECHNICAL FIELD

The present disclosure relates generally to computer networks, and more specifically related to displaying images on display devices over a computer network.

BACKGROUND INFORMATION

In today's computer network environment, synchronized or related sessions are often conducted between two remotely connected computers. However, remote controlling a computer from another requires huge amount of data to be transferred continuously between the controlling and the controlled computers. The majority of the data transferred between is the representation of the screens of the controlled computer. As a remote control operation happens in real time, performance of the remote control session is of utmost importance. Any delay in synchronizing the screen images will greatly impact the quality of the remote control session, leaving the users uncomfortable and unsatisfied. One technique to improve the performance of a remote control operation is to reduce the amount of data that needs to be transferred to represent the screen images. This is especially important when the network bandwidth of the communication channel linking the two computers is constrained such as in a wireless or other slow-link environment.

One technique to reduce the transferred information is to send only changes or (changes with respect to the information that was previously transferred) from the controlled computer. However, even just sending the changes, the amount of data sent remains sufficiently high. This solution helps but fails to remedy the problem.

One property of the remote control session is that recurrent screen images are repetitively sent from the controlled computer. This property can be exploited to reduce the amount of data that needs to be sent between the two computers. In some implementations, computer caching techniques are used for storing recurrent screen images, and display them when a detection is accurately made when there is an "exactly the same" image appearing again. It is extremely difficult to use standard techniques like check-summing or sampling to find this "exact match" because of the probability of errors in these techniques.

What is needed is an improved method for displaying recurring images on two computers in a remote control session in a computer network.

SUMMARY

A method and system is provided for enhancing a reproduction of an image of a first computer on a second computer in a computer network. In order to avoid transferring high color depth high volume of data for similar images on one computer to another, the similar image is invoked by an identifier. For example, between a controlling and controlled computer, if a controlled computer detects a first screen image has recurred wherein the first screen image has a relative high color depth, it identifies the first screen image by assigning a first identifier (ID). Then, the controlled computer produces a low color depth representation of the first screen image to be stored, and sends the first screen image to the controlling computer along with the first ID. The controlling computer compresses and stores the first screen image along with the first ID. When the controlled computer, by using the stored low color depth representation of the first screen image, detects that a second screen image is part of the first screen image or is the same as the first screen image, it sends the first ID to the controlling computer for invoking the first screen stored on the controlling computer, and the controlling computer retrieves and displays the stored first screen image.

By saving only a low color depth representation of the first screen image on the controlled computer, it reduces the amount of memory required for the cached data and also reduces the amount of processing required for comparisons. Further, as a less amount of memory is required, a greater number of entries can be cached. Also, since the required comparisons are between low color depth representations of the screen images, the computer processor's utilization is limited. These all help to improve the overall performance of a remote control session between the two computers.

Further, the disclosed method also reduces the bandwidth used between the two computers without affecting the memory consumption or computer processor utilization significantly. Whenever, the screen image that has to be sent is found in the cache memory, only the reference/identifier of the screen image is sent through the communication channel connecting the two computers. The amount of data for the identifier is negligible or only a negligible bandwidth of the communication channel is used.

DETAILED DESCRIPTION

While displaying a computer screen image, the image is usually described as a collection of pixels. Based on the resolution of the screen, each pixel is represented by several bits. For example, if the screen is at 32-bit resolution, it means that each pixel on the screen is represented by 32 bits. Therefore, if the height and width of the screen is 1024×768 pixels, the entire screen information would be represented by 1024×768×32 bits.

In order to send a screen image without any degradation, a snapshot of the screen is sent. This full scale image can be further compressed using conventional compression techniques. However, even after the compression, the amount of data to be sent is still relatively high. Now, if the data that needs to be sent is repeated (e.g., when the user of a computer simply minimizes and maximizes the active window), sending the recurrent screen image results in the waste of available bandwidth of the communication channel set up between the two computers.

To avoid sending the same data again and again over the network, a caching mechanism is also utilized, although not required, where representations of the screen image with lesser number of bits are stored temporarily at the controlled computer, thus resulting in a much smaller amount of data stored. On the other side, the recurrent image is sent once at its normal resolution so that there is no image degradation when the other computer needs to display the image.

Figure 1:
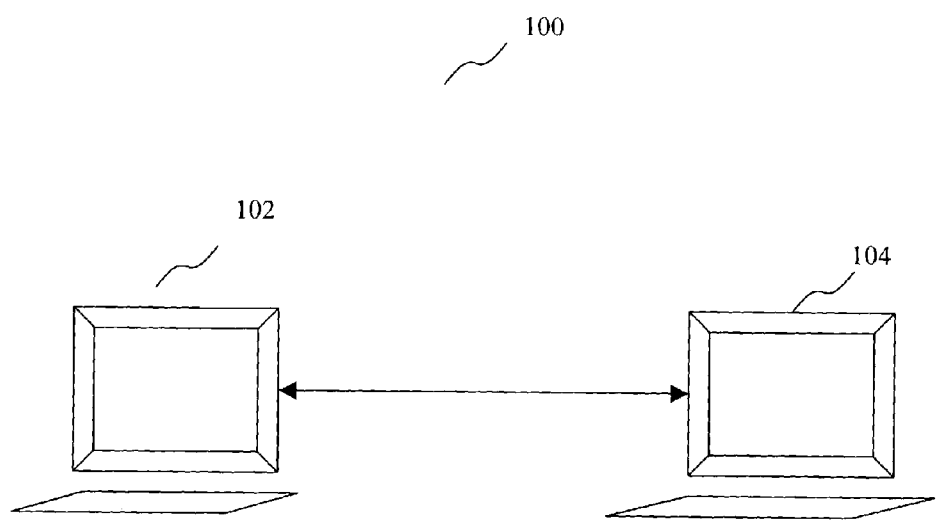
FIG. 1 illustrates a computer network connecting at least two computers in a remote control session.

FIG. 1 illustrates a simplified computer network 100 with two computers 102 and 104 connected therethrough. The computers are assumed to be in a remote control session with one of them as the controlled computer 102 and the other as the controlling computer 104. It is further assumed that the color settings for the color depth at both the controlled and the controlling computer is 32 bits and at 1024×768 resolution. The screen displays of both the controlled and controlling computers are expected to be synchronized in a real time fashion in the ideal world.

Figure 2:
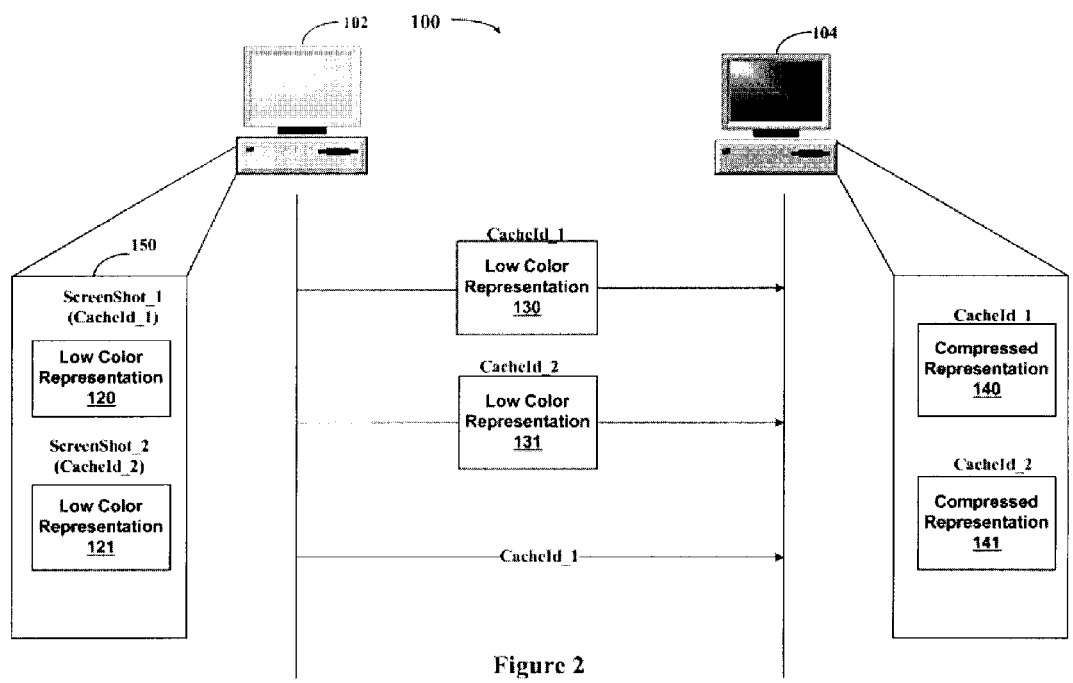
FIG. 2 illustrates an embodiment of a remote control session between a controlled computer 102 and controlling computer 104.
Figure 3:
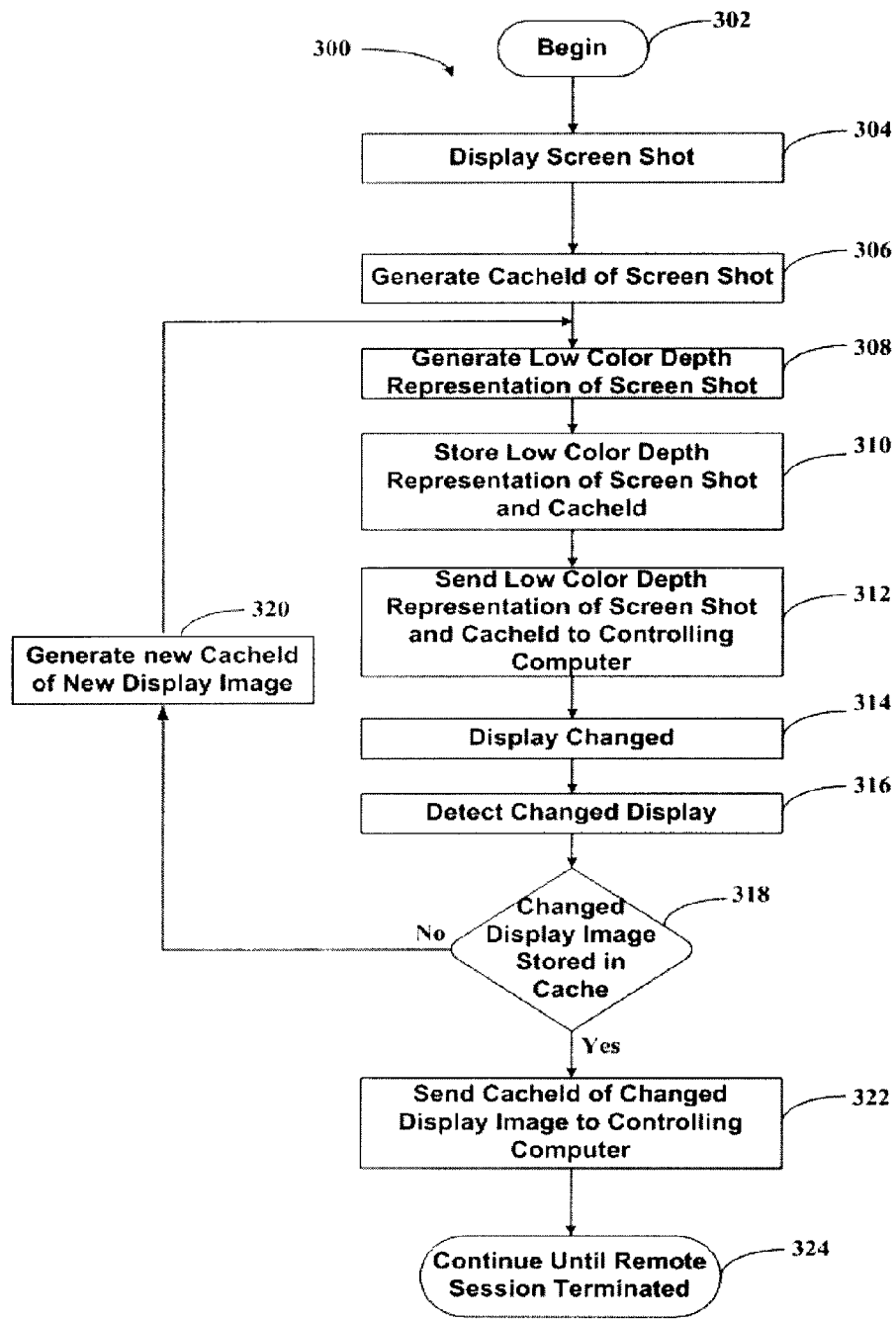
FIG. 3 depicts a flowchart of an embodiment of remote control session processing by a controlled computer.

With reference now to FIG. 2 which depicts an embodiment of a remote control session between controlled computer 102 and controlling computer 104 and FIG. 3 which depicts a flowchart 300 of an embodiment of remote control session processing by controlled computer 102, when a remote control session starts (step 302), assuming initially that there are no applications running on the computer 102, the initial display (step 304) is referred to as ScreenShot_1. The controlled computer 102 generates a cache id (step 306), for example CacheId_1, and reduce the 32-bit representation to low color depth representation 120 (step 308) such as a 1-bit representation of the ScreenShot_1. For conversion of high color resolution to a lower color resolution, software such as Microsoft Windows API can be used.

Figure 4:
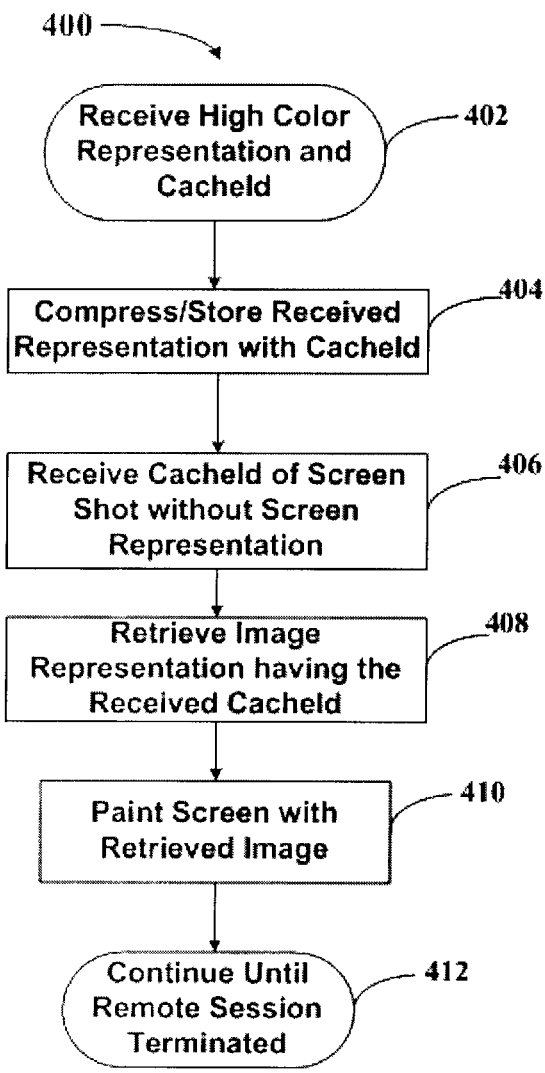
FIG. 4 depicts a flowchart of an embodiment of remote control session processing by a controlling computer.

The controlled computer 102 stores temporarily or caches the 1-bit representation 120 on itself (step 310) and sends the 32-bit representation 130 along with CacheId_1 to the controlling computer 104 (step 312). With reference now to FIG. 4 which depicts a flowchart 400 of an embodiment of remote control session processing by controlling computer 104, after receiving the full scale ScreenShot_1 (step 402), the controlling computer 104 stores the 32-bit ScreenShot_1 tentatively in its memory space. In order to save the memory space, the controlling computer 104 may compress this 32-bit Screen-Shot_1 to a compressed version 140 and caches the same (step 404), which is to be identified by Cache_Id1.

Assuming that the user launches an application on the controlled computer, at this point in time the display of the controlled computer 102 changes and results in a Screen-Shot_2 (step 314). The controlled computer 102 detects that changes have been made to the screen (step 316), and further compares with all images stored in its memory/cache to determine whether this ScreenShot_2 is the same as any of those stored in its cache (step 318). If not, the controlled computer 102 generates a new reference number for the screen such as Cache_Id2 (step 320). The controlled computer will then return to step 308 to produce and store a 1-bit representation 121 of ScreenShot_2 and send a 32-bit representation 131 of ScreenShot_2 to the controlling computer 104. As usual, the controlling computer 104 compresses and stores the compressed representation 141 of ScreenShot_2 identified by the reference number CacheId_2 according to steps 402 and 404.

Now, assuming that the user minimizes the application window, resulting in a displayed image substantially or exactly the same as ScreenShot_1. The controlled computer 102 determines this at step 318 by comparing the 1-bit representation of this new screen with the ones it has cached in the memory. In this case, it finds that information identified by CacheId_1 matches with the new screen. Hence, it sends the reference CacheId_1 alone without any full scale representation of the screen image to the controlling computer 104 (step 322) informing the controlling computer that a recurring image has appeared on receipt of the CacheId by controlling computer 104 (step 406). The controlling computer calls the 32-bit representation of ScreenShot_1 stored in the memory (step 408) and indexed by CacheID_1 and paints its screen accordingly (step 410). The controlled and controlling computer processes may continue until the remote session is terminated as indicated at step 324 and 412.

Now further assuming that the user maximizes the application window again, resulting in a window display that is the same as ScreenShot_2. The controlled computer will inform the controlling computer about the reference CacheId_2 for retrieving the cached ScreenShot_2.

It is noted that at the controlling computer 104, the full scale 32-bit representations of the screen shots are compressed and cached so that they can maintain the quality of the screen representations without occupying huge memory space. There is no excessive burden on the computer process of the controlling computer to bring up the screen images because the controlling computer never has to compare against its caches. The controlling computer gets a CacheId from the controlled computer and simply retrieves the image accordingly. Further, on the controlled computer side, reduction in used memory space is achieved.

Using above described method for synchronizing the screen displays of two remotely located computers over a network, a reduction in the communication bandwidth requirement and an improvement of the performance are achieved. The controlled computer only has to send the CacheId to the controlling computer instead of the full scale image, thus significantly reducing the bandwidth required for transferring the information. Moreover, the information that is cached at the controlled computer 102 is significantly lower (e.g., 32/1=32 times) than what would have been required to store the entire screen shot. Hence, the memory required at the controlled computer to store the information is significantly low and in turn the computer processor time required to compare against this cached low depth representation would be significantly low. On the other side, as the controlling computer has cached the 32-bit ScreenShot_1 for CacheId_1, there would be no loss of information at the controlling computer. In addition, storing less amount of information at the controlled computer also allows to have an increased number of entries to be stored in the cache.

Another embodiment of the present disclosure is that it is possible to compare even a part of image from the cached images. For example, if the co-ordinates of an image are stored along with the image data, and if a new image matches a part of the stored image, which can be identified by a set of co-ordinates, the co-ordinates are sent to the controlling computer along with the identifier for the stored image so that a part thereof can be retrieved and displayed on the controlling computer. As such, the communication bandwidth is also saved. This allows a more flexible mechanism for synchronizing substantially similar screen images on two or more remotely connected computers. In addition, if the screen image data is relative small, there is no mechanism like the above need to be used as the small amount of data can be sent directly to the other computers.

As described above, whenever the display information is changing rapidly and the information is repetitive in nature, the above described method can be very useful to reduce the bandwidth requirement significantly.

While the invention has been particularly shown and described with reference to the preferred embodiment thereof, it will be understood by those skilled in the art that various changes in form and detail may be made therein without departing from the spirit and scope of the invention as set forth in the claims. For instance, it is understood that although the two computers mentioned above are labeled as a controlling computer and a controlled computer, in many situations, they do not have to bear the server-client or controlling-controlled relationship as long as these two computers need to share same screen images. The data traffic between these two computers can actually be bi-directional.

It is understood that several modifications, changes and substitutions are intended in the foregoing disclosure and in some instances some features of the invention will be employed without a corresponding use of other features. Accordingly, it is appropriate that the appended claims be construed broadly and in a manner consistent with the scope of the invention.

What is claimed is:

1. A method for reproducing an image of a first computer on a second computer in a computer network, the method comprising:
   detecting a first screen image on the first computer, the first screen image having a first color depth;
   producing a representation at a second color depth of the first screen image to be stored on the first computer, wherein the second color depth is lower than the first color depth;
   sending the first screen image of the first color depth to the second computer;
   compressing and storing the first screen image on the second computer;
   detecting, by the first computer, that a second screen image is a portion of the first screen image using the stored second color depth representation of the first screen image; and
   responsive to the detecting by the first computer that the second screen image is a portion of the first screen image, invoking the portion of first screen image for display at the first color depth on the second computer, wherein the invoking comprises sending to the second computer a co-ordinate set identifying the portion of the first screen image corresponding to the second screen image such that only the identified portion of the first screen image is displayed on the second computer.

2. The method of claim 1 further comprising identifying the first screen image by assigning a first identifier (ID).

3. The method of claim 2 wherein the first ID and the second color depth representation of the first screen image are stored in a cache memory of the first computer.

4. The method of claim 1 wherein the invoking further comprises retrieving and displaying the stored first screen image of the first color depth on the second computer.

5. The method of claim 1 wherein the detecting further comprises detecting that the second screen image is the same as the first screen image.

6. The method of claim 1 wherein the first screen image of the first color depth is stored in a cache memory of the second computer along with an identifier.

7. A method for reproducing a recurring image of a controlled computer on a controlling computer in a computer network, the method comprising:
   detecting a first screen image on the controlled computer, the first screen image having a first color depth;
   identifying the first screen image by assigning a first identifier (ID);
   producing a second color depth representation of the first screen image to be stored on the controlled computer, wherein the second color depth is lower than the first color depth;
   sending the first screen image to the controlling computer along with the first ID;
   compressing and storing the first screen image on the controlling computer along with the first ID;
   detecting, by the controlled computer, that a second screen image is a portion of the first screen image using the stored second color depth representation of the first screen image;
   responsive to detecting the second screen image is a portion of the first screen image, sending to the controlling computer the first ID and a co-ordinate set identifying the portion of the first screen image corresponding to the second screen image for invoking the identified portion of the first screen stored on the controlling computer; and
   retrieving the identified portion of the first screen image with the first ID and the co-ordinate set and displaying the identified portion of the stored first screen image on the controlling computer;
   wherein the second color depth representation is a one-bit representation.

8. The method of claim 7 wherein the detecting further comprises detecting that the second screen image is the same as the first screen image.

9. The method of claim 7 wherein the first ID and the second color depth representation of the first screen image are stored in a cache memory of the controlled computer.

10. The method of claim 7 wherein the first screen image of the first color depth is stored in a cache memory of the controlling computer.

11. The method of claim 7 further comprising sending a co-ordinate set in the first screen image corresponding to the second screen image to the controlling computer for identifying and displaying the second screen image on the controlling computer.

* * * * *